United States Patent
Baumgartner et al.

(10) Patent No.: US 9,976,613 B2
(45) Date of Patent: May 22, 2018

(54) WET-RUNNING MULTIPLE DISC BRAKE AND SYSTEM

(75) Inventors: Johann Baumgartner, Moosburg (DE); Aleksandar Pericevic, Munich (DE); Steffen Geissler, Rodgau (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 442 days.

(21) Appl. No.: 13/251,658

(22) Filed: Oct. 3, 2011

(65) Prior Publication Data

US 2012/0061191 A1 Mar. 15, 2012

Related U.S. Application Data

(63) Continuation of application No. PCT/EP2010/001839, filed on Mar. 24, 2010.

(30) Foreign Application Priority Data

Apr. 2, 2009 (DE) .................. 10 2009 015 937

(51) Int. Cl.
*F16D 65/12* (2006.01)
*F16D 65/18* (2006.01)
(Continued)

(52) U.S. Cl.
CPC ......... *F16D 65/128* (2013.01); *F16D 65/186* (2013.01); *F16D 65/853* (2013.01); *F16D 2065/1328* (2013.01); *F16D 2065/788* (2013.01)

(58) Field of Classification Search
CPC ...... F16D 65/78; F16D 65/128; F16D 65/853; F16D 2065/783; F16D 2065/788; F16D 2065/1328
(Continued)

(56) References Cited

U.S. PATENT DOCUMENTS 2,518,016 A    8/1950  Johnson et al.
2,955,683 A *  10/1960 Kelley .................. F16D 65/853
                                                188/152
(Continued)

FOREIGN PATENT DOCUMENTS

DE    12 14 101 A    4/1966
DE    23 31 315 A1   1/1975
(Continued)

OTHER PUBLICATIONS

International Search Report dated Oct. 11, 2010 with English translation (eight (8) pages).

(Continued)

*Primary Examiner* — Thomas J Williams

(74) *Attorney, Agent, or Firm* — Crowell and Moring LLP

(57) ABSTRACT

A disc brake runs wet by use of cooling fluid, in particular for a road vehicle, and includes stationary stator discs arranged in parallel to and at a distance from one other, and between which in each case a rotatable rotor disc is arranged. During braking, the radially extending stator discs and rotor discs can be pressed against one another, closing an air gap and, after the brake has been released, can be separated from one another, forming the air gap. The brake is designed such that the rotor discs have cooling channels which can be filled with cooling fluid immediately before or at the start of braking.

14 Claims, 4 Drawing Sheets

(51) Int. Cl.
 *F16D 65/853* (2006.01)
 *F16D 65/02* (2006.01)
 *F16D 65/78* (2006.01)

(58) Field of Classification Search
 USPC ...... 188/71.6, 264 D, 264 CC, 264 P, 264 F; 192/113.3, 113.34, 113.35
 See application file for complete search history.

(56) References Cited

U.S. PATENT DOCUMENTS

| | | | |
|---|---|---|---|
| 2,976,965 A * | 3/1961 | Schjolin | B60T 13/141 188/264 D |
| 3,259,216 A * | 7/1966 | Klaus et al. | 188/264 F |
| 3,410,375 A * | 11/1968 | Schmidt | F16D 55/36 188/196 P |
| 3,590,960 A * | 7/1971 | Reynolds | 188/264 P |
| 3,837,420 A * | 9/1974 | Kobelt | 188/71.6 |
| 4,157,750 A * | 6/1979 | Horsch | F16D 13/72 192/113.35 |
| 4,358,001 A * | 11/1982 | Iverson | 188/71.6 |
| 4,721,191 A * | 1/1988 | Dowell | F16D 55/14 188/218 XL |
| 4,883,149 A | 11/1989 | Campbell et al. | |
| 4,913,267 A | 4/1990 | Campbell et al. | |
| 5,190,123 A * | 3/1993 | Hvolka | B60T 1/062 188/170 |
| 5,240,095 A | 8/1993 | Shimamura et al. | |
| 6,502,674 B2 | 1/2003 | Rheinheimer et al. | |
| 6,708,808 B1 * | 3/2004 | Andres | 188/71.5 |
| 2004/0154894 A1 * | 8/2004 | Braford, Jr. | F16D 13/52 192/70.12 |
| 2005/0167215 A1 | 4/2005 | Kinoshita et al. | |
| 2006/0081423 A1 * | 4/2006 | Daigre | 188/71.5 |
| 2009/0032344 A1 | 2/2009 | Thompson | |
| 2010/0082205 A1 * | 4/2010 | Sabelstrom | B60T 5/00 701/48 |

FOREIGN PATENT DOCUMENTS

| | | |
|---|---|---|
| DE | 74 41 557 U | 1/1977 |
| DE | 33 40 411 A1 | 5/1985 |
| DE | 100 11 018 A1 | 9/2001 |
| DE | 100 57 880 A1 | 11/2001 |
| EP | 0 307 079 A1 | 3/1989 |
| EP | 0 308 048 A1 | 3/1989 |
| EP | 1 075 608 A1 | 2/2001 |
| GB | 778 557 | 7/1957 |
| JP | 04087864 A * | 3/1992 |
| WO | WO 99/56032 A1 | 11/1999 |

OTHER PUBLICATIONS

German Office Action dated Dec. 8, 2009 with English translation (ten (10) pages).

* cited by examiner

WET-RUNNING MULTIPLE DISC BRAKE AND SYSTEM

CROSS-REFERENCE TO RELATED APPLICATIONS

This application is a continuation of PCT International Application No. PCT/EP2010/001839, filed Mar. 24, 2010, which claims priority under 35 U.S.C. § 119 from German Patent Application No. DE 10 2009 015 937.1, filed Apr. 2, 2009, the entire disclosures of which are herein expressly incorporated by reference.

BACKGROUND AND SUMMARY OF THE INVENTION

The invention relates to a wet-running multiple disc brake and more particularly to a multiple disc brake, in particular for a road vehicle, which is wet-running by way of a cooling fluid, and includes stationary stator discs arranged parallel to and spaced apart from one another, between which in each case one rotatable rotor disc is arranged.

Wet-running multiple disc brakes, as are used, for example, in special trucks, and likewise in heavy construction vehicles, tractors and the like, are very low-wear and are operated at a low temperature level. Here, the brake heat which is produced and brake lining wear debris are discharged by way of cooling oil.

The wet-running multiple disc brakes are usually combined with a differential, with the result that the oil of the differential is also used as cooling fluid to operate the multiple disc brake. The oil is guided through a wheel hub and is transported to the outside between the friction faces of the stator discs and the rotor discs as a result of their rotation. This intensive type of cooling makes defined heat dissipation possible via a measurement of the cooling oil flow.

However, this known wet-running multiple disc brake is affected by a series of disadvantages.

In the described special trucks, heavy construction vehicles or heavy tractors, pronounced long-lasting loading of the brakes leads to overheating of the gear oil as a result of the braking heat produced, since the heat can no longer be dissipated completely to the surroundings via the surface of the gear housing. This results in the loss of the lubricating capability of the oil, which can lead to damage of the gear components.

Since the cooling oil is used for lubricating gearwheels, it has a relatively high viscosity because of its function. In the case of clear running, this leads to high drag losses in the air gaps between the rotor discs and the stationary stator discs, and therefore to additional heating of the oil. For this reason, the use of wet-running multiple disc brakes has been limited up to now to slowly running vehicles.

A further serious disadvantage of the known multiple disc brake results from the fact that the braking heat can be guided by the cooling oil flow only via the friction faces, the oil being guided in friction face grooves during the braking operation. The cooling oil flow and, as a result, the possible heat dissipation are therefore limited.

Even after the brake is released, only small throughflow cross sections result on account of very narrow air gaps of from 0.1 to 0.15 mm. For sufficient heat dissipation, it is therefore necessary to keep the energy density therein low by way of a sufficient number of friction contacts.

However, a large number of friction faces and friction discs increases the drag losses of the brake, which, as mentioned, leads to heating of the oil.

Moreover, the overall air play (i.e., clearance gap) is dependent on the number of friction faces and/or friction discs, which results in a large actuation idle travel of the brake in the case of a correspondingly large number. An acceptable actuation idle travel can be achieved only by the fact that the spacing of the friction faces from the rotor and stator discs is kept very small in the non-actuated state of the brake, as a result of which, however, wear and noise problems occur during clear running.

The invention is based on the object of developing a multiple disc brake such that the cooling, that is to say the dissipation of braking heat, is improved substantially.

This and other objects are achieved by a multiple disc brake, in particular for a road vehicle, which is wet-running by way of a cooling fluid, and includes stationary stator discs arranged parallel to and spaced apart from one another, between which in each case one rotatable rotor disc is arranged. In the case of a braking operation, the radially extending stator discs and rotor discs are pressable against one another, with an air gap being overcome, and are separable from one another after the brake is released, with the formation of the air gap. The rotor discs have cooling channels which can be filled with cooling fluid immediately before or at the beginning of the braking operation.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
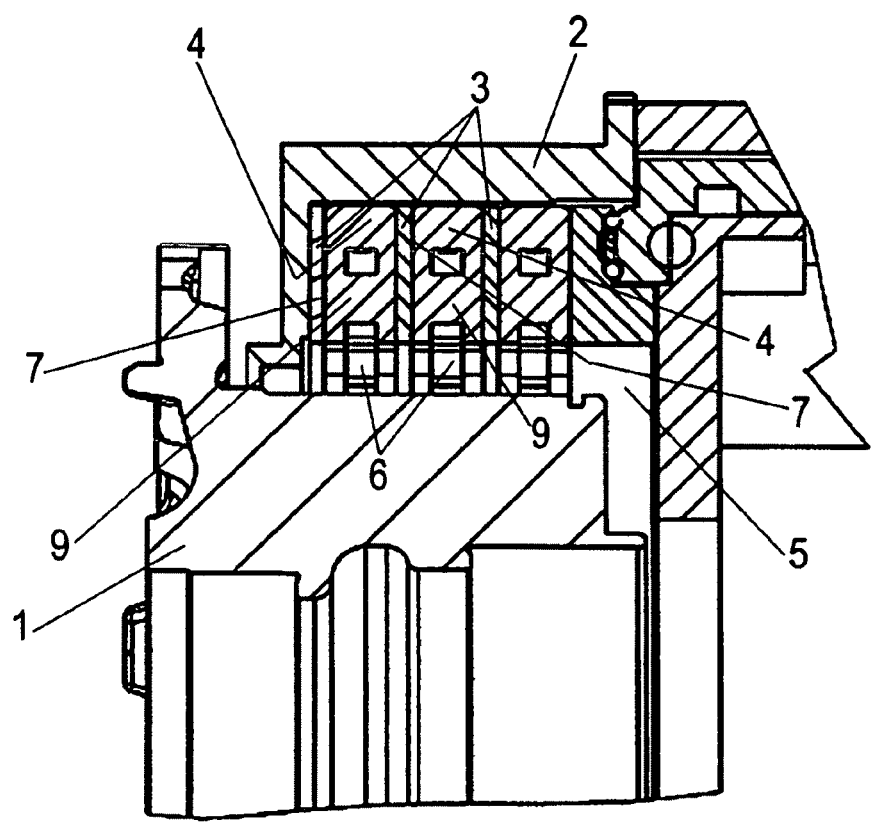
FIG. 1 shows a part detail of a multiple disc brake according to an embodiment of the invention in a longitudinal section view.

In order to improve the cooling of a multiple wet-running disc brake, first of all the number of necessary friction contacts, that is to say the number of frictional contacts between the rotor discs and the stator discs, is to be defined, to be precise from the desired and the achievable braking moment per rotor disc. This can be defined, by way of example, as follows:

Available clamping force $F_N$=180 kN
Achievable coefficient of friction $\mu$=0.125
Effective friction radius $r_{eff}$=0.18 m
Desired braking moment $M_B$=24 kNm Under the precondition of sufficient cooling, these specifications result in the number of required friction contacts:

Braking moment per friction contact $\quad M_S = F_N \cdot \mu \cdot r_{eff} = 4.05\ kNm$ Number of friction contacts $\quad n = \dfrac{M_B}{M_S} \approx 5.93 \Rightarrow n = 6$ Furthermore, the necessary mass and the suitable material of the rotor discs are to be defined from the maximum possible energy application per braking operation and the maximum permissible rotor temperature.

Here, the mass of the rotor discs is selected in such a way that, in the case of a braking operation with a maximum possible energy application, a predefined upper disc limiting temperature is not exceeded. Here, it is assumed that the entire energy is absorbed only by the rotor discs, since, in order to achieve a suitable friction behavior, the stator discs are usually provided with a coating of organic friction material, as a result of which only a low heat absorption takes place, that is to say the stator disc has a low thermal conductivity.

By way of example, the mass and the material of the rotor discs is to be represented in the following:

Braking case which forms the basis: heat cracking test with 5 MJ braking energy for 40 seconds braking duration.

If it is assumed that the heat dissipation to the cooling fluid is 2 MJ during the braking duration and the starting and ending temperatures are fixed as follows, this is the result for the rotor discs:

Heat input, rotor discs Qs=3 MJ
Mean mass temperature at the start $V_a$=90° C.
Mean mass temperature at the end $V_e$=250° C.
Temperature increase, discs $\Delta\theta$=160 K In order to be able to ensure the heat input into the discs under these boundary conditions, there has to be a minimum heat capacity:

Heat capacity:

$$C = \frac{Qs}{\Delta\vartheta} = 18.75 \frac{kJ}{K}$$

Depending on the material of the discs, a necessary overall mass m results as a function of the specific heat capacity c:

| Material | $c\left[\frac{kJ}{kg \cdot K}\right]$ | m [kg] |
| --- | --- | --- |
| Aluminum alloy | 0.94 | 19.95 |
| Cast iron | 0.50 | 37.50 |
| Steel | 0.43 | 43.60 |

As is shown strikingly by the above chart, a multiple wet-running disc brake in accordance with which the rotor discs are composed of an aluminum alloy, affords considerable weight advantages over the previously used materials such as cast iron or steel.

At the low temperature level of at most 250° C., which prevails during a braking operation, an aluminum alloy of this type can be used without problems in wet-running multiple disc brakes.

In order to improve the wear behavior, it is preferable to use wear-resistant aluminum alloys, as are already known from engine production and have proven themselves in that field. As an alternative, the friction faces can also be provided with wear-reducing coatings, for example with titanium carbide coatings.

In addition to the considerably reduced weight, a further advantage is improved heat dissipation of the aluminum alloy on account of its high thermal conductivity.

In the example shown, it can be assumed that the surface temperature of the rotor disc differs only a little from the mean mass temperature. Since the thermal conductivity of cast iron or steel materials in comparison with aluminum lies only at from approximately 15 to 30%, this results in a surface temperature considerably above the mean mass temperature, above all in the case of great wall thicknesses and a high heat input. This effect is not desirable, since the lubricating oil temperature, if a cooling oil is used, therefore also rises in the gap between the rotor disc and the stator disc and damage can occur.

Accordingly, the rotor discs are configured as hollow bodies which can be filled with cooling fluid immediately before or at the beginning of a braking operation, which cooling fluid can consist of every suitable cooling liquid, in addition to the stated cooling oil, for example glycol, glycerol/water mixtures or the like. In addition to this internal cooling, what is known as friction face cooling, which is produced by grooves, can be provided.

For the internal cooling, the cooling oil, for example, which is fed through the wheel hub, to which the stator discs are fastened, is injected into the cavity which is situated between the two friction faces of the stator disc and forms a cooling channel, and is centrifuged to the outside by the rotation of the rotor disc.

The escape of the cooling oil at the outer circumferential edge is preferably restricted by outflow nozzles, the cross sections of which are dimensioned in such a way that a predefined throughflow quantity of the cooling oil through the cooling channel is achieved for predefined rotational speeds.

In this way, an optimum division of the overall cooling oil flow to the friction face cooling and the rotor internal cooling is achieved. Since the dimension of the cross sections of the outflow nozzles is freely selectable within wide limits, there is no narrow restriction for the cooling capacity of the rotor internal cooling, as is the case in exclusive friction face cooling.

As a result of the configuration of the brake in this manner, the heat capacity of the rotor discs is reduced, so that a low mass results during driving operation, in which the rotor discs are not filled with cooling oil.

An optimization of the brake is achieved when the internally coolable rotor discs are composed of the described aluminum alloy. However, the rotor discs can also be configured as thin-walled cast iron or steel constructions.

One advantageous development of the invention is achieved by the fact that the multiple disc brake is coupled in terms of control technology to a brake assist system, with the result that a cooling oil demand is initiated by, for example, a distance measurement to a leading vehicle or a detection of the driver's reaction, for example a corresponding foot movement. The full heat capacity is then made available from the beginning of the braking operation.

By way of example, conditions are to be shown in the following text, as result when the cooling oil is situated in the cavities of the rotor discs, without it being able to escape. In the above-described heat cracking test with oil and rotor heating to 250° C., the results are as follows:

| | |
| --- | --- |
| Overall heat capacity (see above) | $C = 18.75 \frac{kJ}{K}$ |
| Reduced mass, aluminium rotors | $m_R = 10$ kg |
| Specific heat capacity, rotors | $C_R = 0.94 \frac{kJ}{kg \cdot K}$ |
| Heat capacity, rotors | $C_R = m_R \cdot C_R = 9.4 \frac{kJ}{K}$ |
| Required heat capacity, "oil filling" | $C_{oil} = C - C_R = 9.35 \frac{kJ}{K}$ |

-continued

| | | |
|---|---|---|
| Specific heat capacity, oil | $c_{oil} = 2.62 \frac{kJ}{kg \cdot K} (\overline{\vartheta_m} = 170° C.)$ | |
| Oil mass | $m_{oil} = \frac{C_{oil}}{c_{oil}} = 3.57$ kg | |

This results in a weight advantage under the assumption of a sufficient heat transfer coefficient from the rotor disc to the cooling oil:

$$\rho_{A1} = 2.7 \frac{kg}{dm^3};$$

$$\rho_{\ddot{O}1} = 0.82 \frac{kg}{dm^3} (\overline{\vartheta_m} = 170° C.)$$

| | Unit | Without oil filling | With oil filling |
|---|---|---|---|
| Mass, rotors | [kg] | 19.95 | 10.00 |
| Volume, rotors | [dm³] | 7.39 | 3.70 |
| Mass, oil | [kg] | 0.00 | 3.57 |
| Volume, oil | [dm³] | 0.00 | 4.35 |
| Mass, overall | [kg] | 19.95 | 13.57 |
| Volume, overall | [dm³] | 7.39 | 8.05 |

In this example, the weight during the braking operation has been reduced by approximately 32%. In the case of a non-actuated brake, in which no oil volume is situated in the rotor cavities or cooling channels, this even results in a weight reduction of approximately 50%. On account of the comparable value of c·p of the oil, in relation to aluminum in alloys, this weight reduction takes place with a merely 9% increase of the required volume.

If the above calculation is assumed and a throughflow is permitted from the outlet nozzles, the weight of the rotor discs is reduced again.

In the case of a volumetric flow of 2.1 liters per 40 seconds (3.225 liters/minute), half the oil volume in the rotor discs is replaced completely once during a braking operation. The oil can therefore be attributed an approximately 50% higher thermal capacity, provided that the heat transfer to the oil is sufficient. As an alternative, the oil outlet temperature can be reduced by an oil exchange. To this end, for example, a cooling system which is independent of other vehicle assemblies can be used, for example an oil/air heat exchanger, by way of which the heat is discharged directly to the surrounding air, or an oil/water heat exchanger which is cooled by way of the cooling water of the engine cooling system.

The cooling circuit which integrates one or more brakes is independent of differential components and therefore permits the use of a cooling oil which is adjusted exclusively to the requirements of the brake. Here, the requirements for the lubricating properties are comparatively low, with the result that the selection of the oil is defined mainly by requirements of maximum heat dissipation and as low a thermal power loss as possible.

Figure 2:
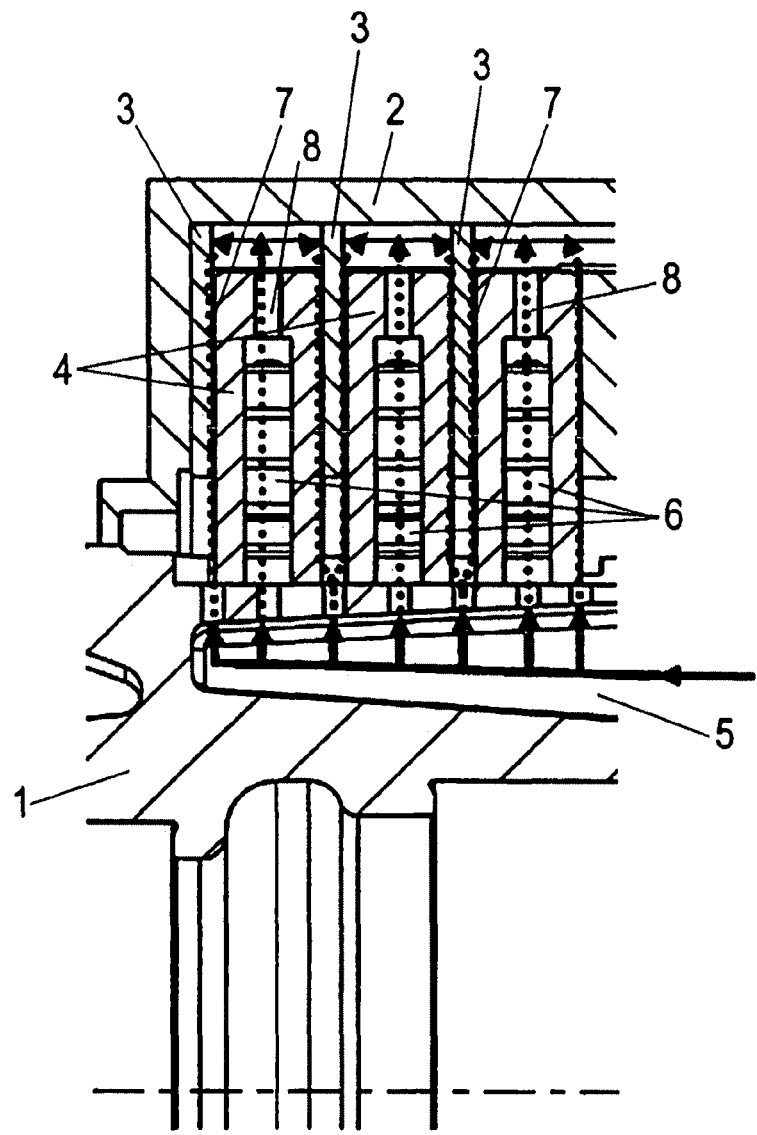
FIG. 2 shows a further part detail of the multiple disc brake in a differing plane.

FIGS. 1 and 2 show a part of a multiple disc brake, which is wet-running by means of cooling oil, in particular for a road vehicle. The dotted lines together with the arrow designations represent the flow of the cooling oil in FIG. 2.

The multiple disc brake has stator discs 3, which are arranged in parallel and at a spacing from one another. The stator discs 3 are held such that they cannot rotate on a stationary housing. Between the stator discs 3 in each case, one rotatable rotor disc 4 is arranged which is fastened to a hub 1 of the vehicle.

In the case of a braking operation, the radially extending stator discs 3 and the rotor discs 4 can be pressed against one another, while overcoming an air gap 7. The air gap 7 is then formed again after the brake is released, in which case the stator 3 and rotor 4 discs are separated from one another.

According to one embodiment, the rotor discs 4 are configured as hollow bodies which can be filled with cooling oil immediately before or at the beginning of a braking operation. To this end, the respective rotor disc 4 has radially extending cooling channels 6, which are delimited on the outer circumference by a wall, in which outflow nozzles 8 are provided in a radially extending manner.

Figure 4:
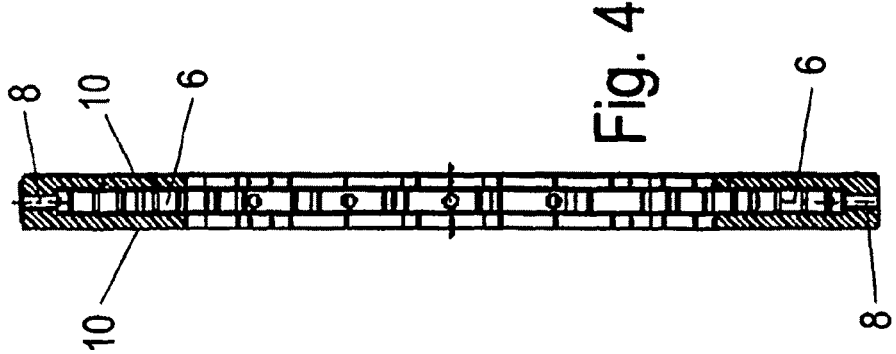
FIG. 4 shows a cross-section through the detail corresponding to the line IV-IV in FIG. 3.
Figure 3:
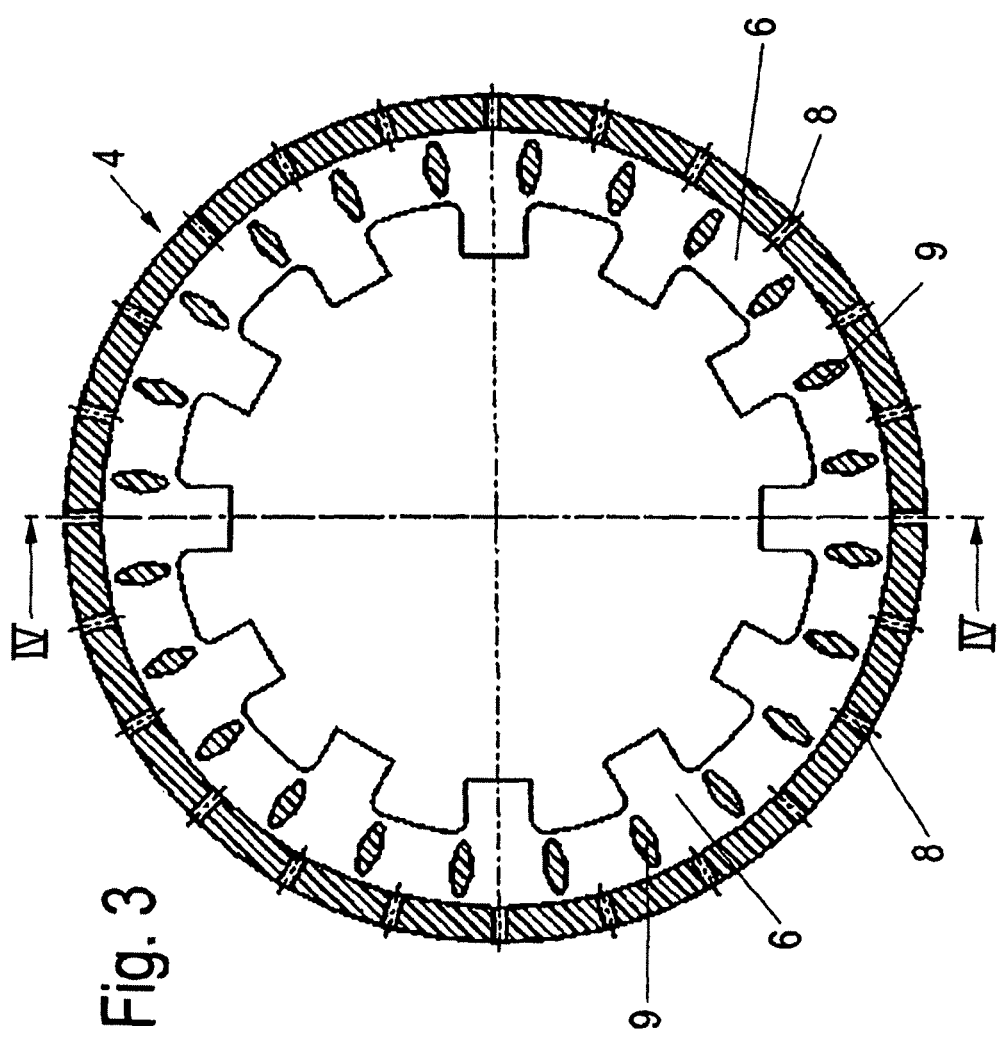
FIG. 3 shows a detail of the multiple disc brake in a sectional plan view.

As represented very clearly, in particular with respect to FIGS. 3 and 4, connecting webs 9 are provided between two friction belts 10, which delimit the cooling channels 6 laterally. The connecting webs 9 exert a radial conveying action on the cooling oil as a result of their design and, at the same time, intensify a heat transfer, that is to say they act as heat exchanger faces.

FIG. 2 shows the multiple disc brake 12 in operation, in which the stator discs 3 bear frictionally against the rotor discs 4. Here, the cooling oil is guided via a feed device 5 in the hub 1 into the cooling channels 6, and likewise in grooves of the friction faces of the rotor discs 4 and/or the stator discs 3. These friction faces form the outer sides of the friction belts 10. The oil throughflow is shown as a dotted line.

The cooling oil escapes out of the outlet nozzles 8 as a result of the rotation of the rotor discs 4, taking the absorbed heat output by the friction belts 10 with it.

Figure 5:
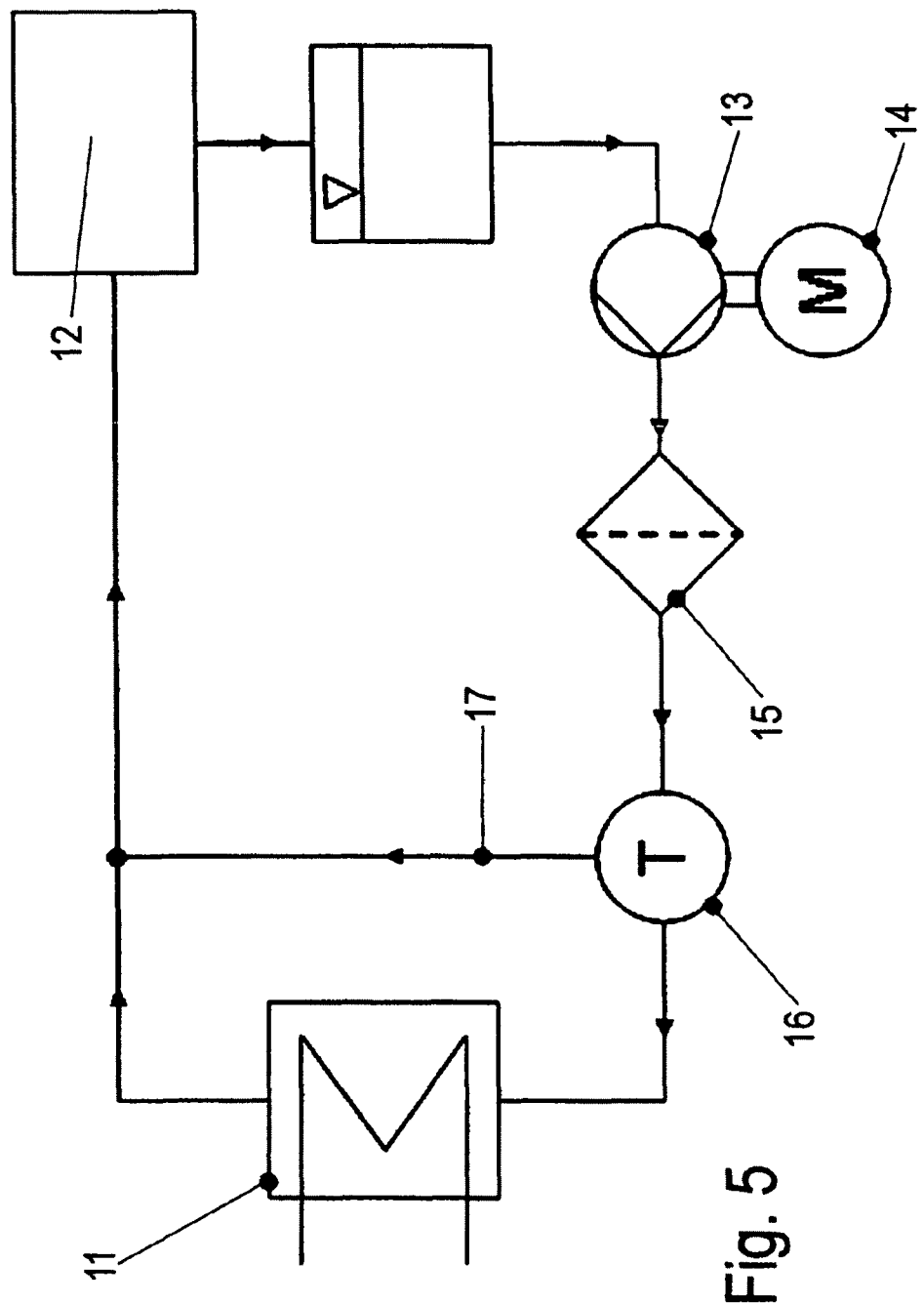
FIG. 5 shows a cooling circuit for operating the multiple disc brake in a diagrammatic illustration.

As shown in FIG. 5, a heat exchange of the cooling oil can take place in a separate cooling circuit. To this end, a heat exchanger 11 is provided, for example an oil/air or oil/water heat exchanger. The heat exchanger may be connected to the engine cooling system.

The cooling circuit is equipped with a controllable pump 13 which can be operated via an electric or mechanical drive 14, and with a particle filter 15 for filtering out wear debris which is produced during braking. Instead of a mechanically driven pump 13, the volumetric flow can also be regulated via corresponding valve circuits.

Furthermore, separate regulation of the cooler volumetric flow is provided by a thermostat circuit 16, having a bypass path 17, parallel to the heat exchanger 11.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:
1. A multiple disc brake using a cooling fluid, the multiple disc brake comprising:
 a plurality of stationary stator discs arranged parallel to, and spaced apart from, one another;
 one or more rotatable rotor discs each rotatable rotor disc being respectively arranged between adjacent ones of the stationary stator discs, air gaps being formed between the stator and rotor discs; wherein
 the rotor discs consist essentially of an aluminum alloy,
 each of the rotatable rotor discs has a cooling channel that is configured to be: i) filled with the cooling fluid immediately before a braking operation, and ii) not filled with the cooling fluid during driving operation,
one of the one or more rotatable rotor discs is fastened to a wheel hub of a vehicle,
rotor discs comprise friction belts forming friction faces, said friction belts having a wear-reducing coating,
the rotor discs comprise webs connecting the friction belts, and
the cooling channels are assigned to the connecting webs.

2. The multiple disc brake according to claim 1, further comprising outlet nozzles operatively configured to direct cooling fluid from the cooling channels toward an outer circumference.

3. The multiple disc brake according to claim 2, wherein the outlet nozzles have a cross-sectional dimension that is a function of a predefined rotational speed of the rotor discs and a predefined throughflow quantity of the cooling fluid.

4. The multiple disc brake according to claim 1, further comprising a brake assist system operatively coupled with the multiple disc brake.

5. The multiple disc brake according to claim 1, wherein one of the one or more rotatable rotor discs is fastened to a wheel hub of a vehicle.

6. A disc brake system, comprising:
a multiple disc brake using a cooling fluid, the multiple disc brake comprising;
a plurality of stationary stator discs arranged parallel to, and spaced apart from, one another;
one or more rotatable rotor discs, each rotatable rotor disc being respectively arranged between adjacent ones of the stationary stator discs, air gaps being formed between the stator and rotor discs; wherein
the rotor discs consist essentially of an aluminum alloy,
each of the rotatable rotor discs has a cooling channel that is configured to be: i) filled with the cooling fluid immediately before a braking operation, and ii) not filled with the cooling fluid during driving operation,
one of the one or more rotatable rotor discs is fastened to a wheel hub of a vehicle,
rotor discs comprise friction belts forming friction faces, said friction belts having a wear-reducing coating,
the rotor discs comprise webs connecting the friction belts, and
the cooling channels are assigned to the connecting webs.

7. The disc brake system according to claim 6, further comprising a separate cooling circuit operatively coupled with the multiple disc brake to route cooling fluid to and from the multiple disc brake, wherein the separate cooling circuit comprises one of a fluid/air and fluid/water heat exchanger.

8. The disc brake system according to claim 7, further comprising:
an engine cooling system; and
wherein the fluid/water heat exchanger is coupled to the engine cooling system.

9. The disc brake system according to claim 7, wherein the engine cooling circuit further includes a controllable pump.

10. The disc brake system according to claim 8, wherein the engine cooling circuit further includes a controllable pump.

11. The disc brake system according to claim 7, wherein the engine cooling circuit includes a particle filter.

12. The disc brake system according to claim 6, wherein the separate cooling circuit includes valve circuits for regulating a volumetric flow in the engine cooling circuit.

13. The disc brake system according to claim 6, wherein the separate cooling circuit includes a thermostat circuit.

14. The disc brake system according to claim 6, wherein one of the one or more rotatable rotor discs is fastened to a wheel hub of a vehicle.

* * * * *